Feb. 1, 1938. F. COURTINADE 2,107,104
DIRECTION SIGNAL FOR VEHICLES
Filed June 10, 1936 2 Sheets-Sheet 1
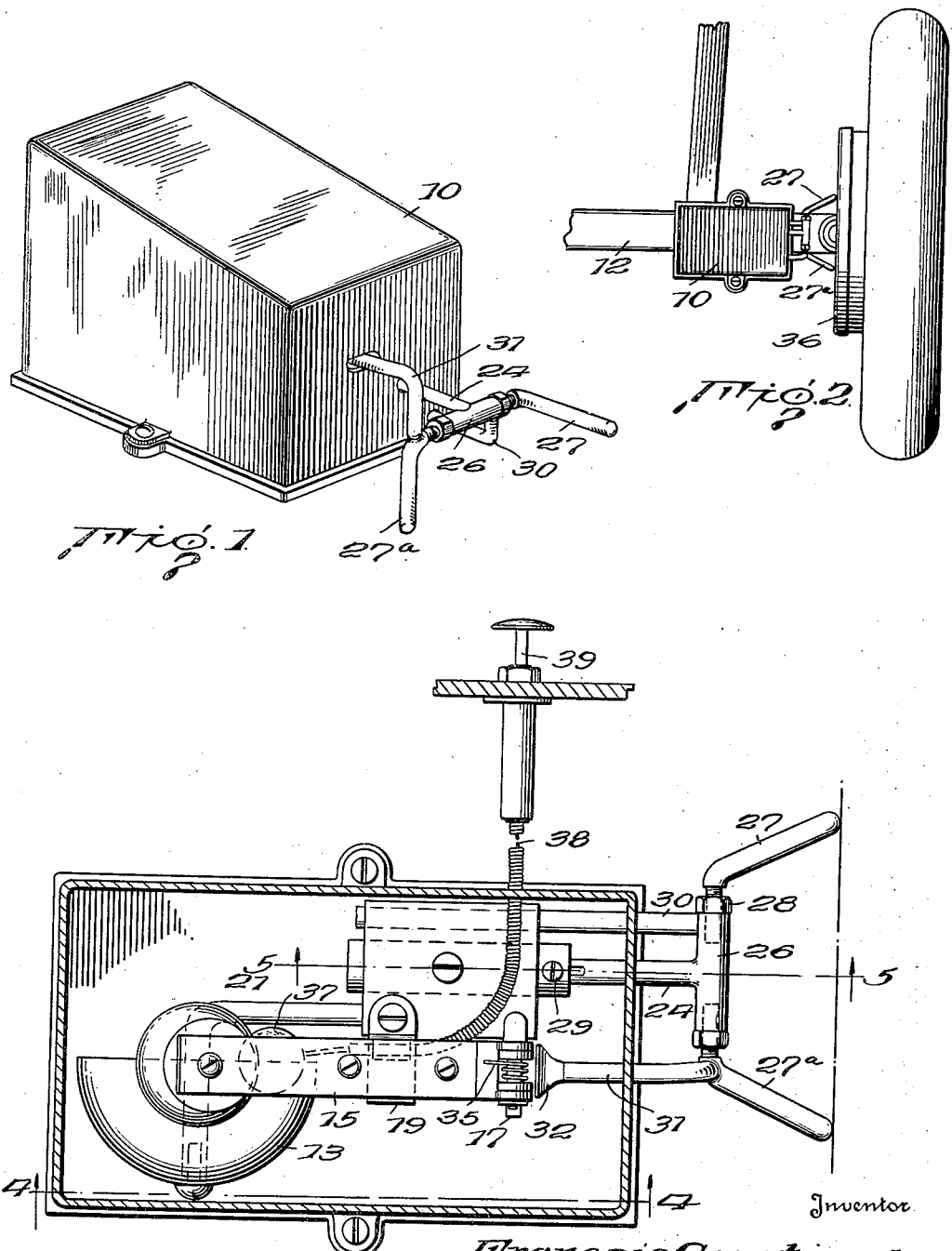
Inventor
François Courtinade,
By Church & Church
His Attorneys

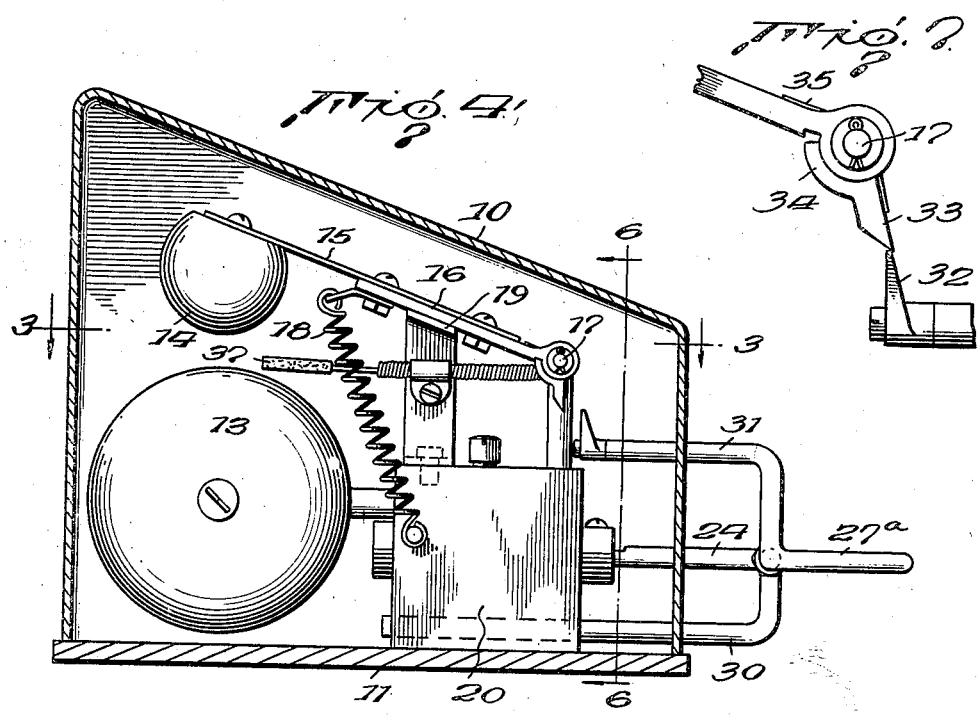
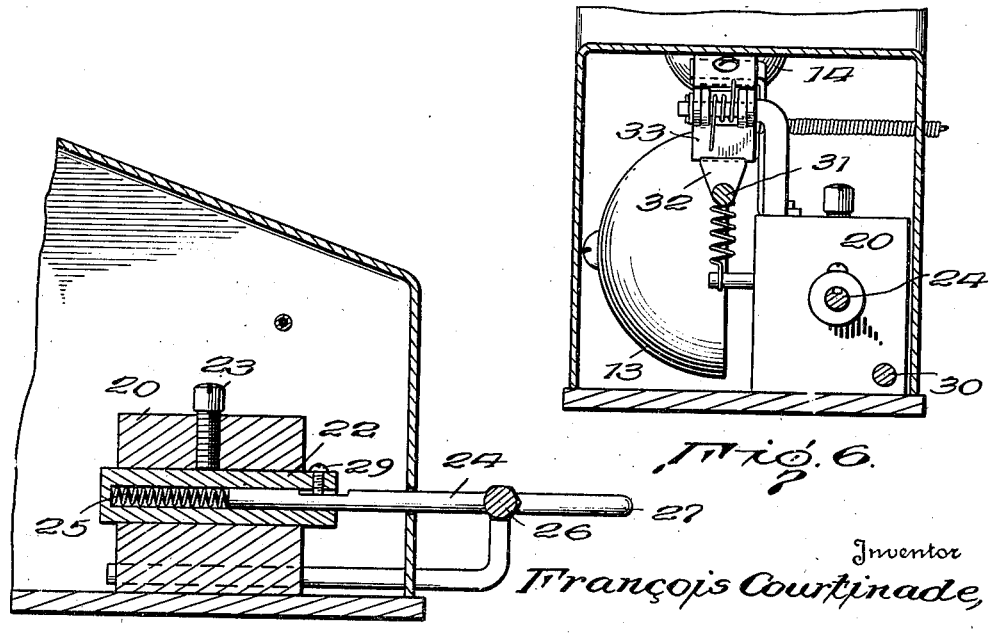

Patented Feb. 1, 1938

2,107,104

UNITED STATES PATENT OFFICE 2,107,104

DIRECTION SIGNAL FOR VEHICLES

François Courtinade, New York, N. Y.

Application June 10, 1936, Serial No. 84,551

11 Claims. (Cl. 116—36)

This invention relates to improvements in signaling devices for indicating changes in the direction of movement in vehicles.

One object of the invention is to provide a signaling device that will be rendered operative upon movement of the steering wheels of a vehicle out of their normal forward direction of travel.

A further object is to provide a signaling device of the character described which is operable by means loosely engaging a structural portion of only one of the front or normal steering wheels of the vehicle.

Another object is the provision of an audible signal which is rendered operable by one of the front or steering wheels of a vehicle upon change in direction of travel of the front wheels.

More specifically, the invention contemplates an audible signaling device of the character described wherein the clapper for a gong is moved away from the gong by a trip member which is engaged and actuated by an extension on a slidable bar, which bar has a bifurcated end, with the bifurcations engaging a structural portion of the vehicle steering wheel at points fore and aft of the axle for said wheel, the clapper being forcibly returned against the gong by a spring, upon disengagement of said trip and the trip-actuating means.

A further object of the invention is to provide means in the form of a cushion or pad for rendering the signal inoperative, said cushion or pad being adapted to be interposed between the clapper and gong to prevent the clapper impacting against the gong.

With these and other objects in view, the invention consists in certain details of construction and combinations and arrangements of parts, all as will hereinafter be more fully described and the novel features thereof particularly pointed out in the appended claims.

In the accompanying drawings—

Figure 1 is a prespective view of the housing for the signaling device, with the bifurcated end portion of the actuating bar projecting from the housing;

Fig. 2 is a top plan view illustrating the signaling device installed on the vehicle;

Fig. 3 is a horizontal sectional view through the housing of the signaling device, the plane of the view being indicated by the line 3—3 of Fig. 4;

Fig. 4 is a vertical sectional view on the line 4—4 of Fig. 3;

Fig. 5 is a similar view on the line 5—5 of Fig. 3;

Fig. 6 is a vertical sectional view taken transversely of the casing for the housing on the line 6—6 of Fig. 4; and Fig. 7 is a detail elevational view of the trip member and its actuating element in the position these parts occupy at a point just immediately prior to their disengagement after the signal has been operated.

The major portion of the device is enclosed in a casing 10 for protection against dust and other foreign matter and said casing has a base 11 by means of which the casing can be mounted upon the front axle 12 of the vehicle. Mounted within the casing is a gong 13 with which a clapper 14 cooperates, the clapper preferably being carried on an arm having a flexible portion 15 and a substantially rigid portion 16. Preferably the latter is pivoted on a shaft 17 and yieldingly urged toward the gong by a spring 18, movement of the clapper toward the gong being limited by a stop 19 which may be formed by a bracket mounted upon a block 20 within the casing. The gong itself may also be mounted on the block as by an arm 21. Slidably mounted in a tubular member 22 secured in block 20 by a set screw 23 is a bar or rod 24 which is yieldingly urged outwardly with respect to the casing by a spring 25 within the sleeve-like member 22. At the exterior of the casing the bar 24 is formed with a cross-piece 26 having extensions at its opposite ends adapted to engage a structural portion of one of the wheels of the vehicle at points in front of and at the rear of the axle of said wheel. These extensions, indicated at 27, 27ª, are preferably formed spearately of the cross-piece 26, being formed with threaded ends adapted to be screwed into sockets in cross-member 26 and locked therein by nuts 28. Rotary movement of rod 24 in tubular member 22 may be prevented by a screw 29 and, if desired, an extension 30 carried by the cross-piece 26 of rod 24 and slidably engaging in a way in block 20, may be provided.

Extending into the casing 10 from extension 27ª of cross-piece 26 is an arm 31 having a trip finger 32 provided at its inner end. Loosely mounted on shaft 17 is a trip member 33 having an arcuate portion 34 adapted to engage against the portion 16 of the arm carrying the bell clapper 14. The trip 33 is yieldingly urged into engagement with the clapper arm by a spring 35. Inward motion of bar 24 and, therefore, extension 31, will cause the trip finger 32 to engage against trip 33 and elevate the clapper 14, but immediately upon the trip finger 32 passing trip 33, it is apparent that the same will be released with the result that spring 18 will cause the clapper 14 to be forcibly impacted against the gong.

As shown in Fig. 2, the extensions 27, 27a, preferably engage against the dust cover 36 carried by the brake drum of the vehicle wheel and with the arrangement described, whenever the wheel changes its direction of travel, one or the other of extensions 27, 27a, will be forced toward casing 10, with the result that extension 31 moves inwardly and trip finger 32 engages trip member 33 and actuates the gong, as previously described. This is true regardless of the direction in which the wheel of the vehicle is turned. When the wheel is returned to its normal direction of travel, i. e., straight forward, bar 24 will be forced outwardly by spring 25 to return the extensions 27, 27a, into abutting engagement with the dust cover of the wheel. During this return movement of bar 24, trip finger 32 is permitted to pass the trip member 33 by reason of the fact that the latter is loosely mounted on shaft 17 and is structurally separate and distinct from the clapper arm. In other words, it is only necessary for the spring 35 to be overcome to permit bar 24 to return to its normal position. It will be understood that after trip finger 32 has passed trip member 33, when being restored to normal position, spring 35 will return the trip member to a position in which the arcuate portion 34 engages the clapper arm, so that the parts are positioned ready for the signal to be repeated upon change in the course of the vehicle.

As there may be times when it is desired to render the mechanism inoperative, a cushion or pad 37 is provided, being carried by a wire 38 which extends to a point adjacent the driver's seat so that it may be operated by a pedal 39, the pedal being normally held in the position illustrated in Fig. 3 by a spring (not shown). When it is desired to render the signal inoperative, depression of pedal 39 will cause the pad or cushion to be projected to a position where it will be interposed between the clapper 14 and gong 13, so that even though the clapper may be actuated, nevertheless the signal will not be sounded.

The gong may have any desired tone, but preferably one that will serve as a suitable warning. The mechanism is simple and inexpensive and, what is also important, may be readily installed, as it does not require any connection to the wheel or wheel structure. It need only be mounted on the axle of the vehicle at a point where the extensions 27, 27a, will abut against a structural portion of the wheel.

What I claim is:

1. In a vehicle direction indicator, the combination of the steering wheels of the vehicle, an audible signal comprising a clapper and a gong, a slidable member for actuating said clapper, means abutting against but detached from one of the steering wheels of the vehicle at points fore and aft of the axle of said wheel for imparting a sliding movement to said member and connections between said member and clapper for moving the latter away from the gong.

2. In a direction indicator for vehicles, the combination of the steering wheels of the vehicle, a signal, a housing, and reciprocatory means slidable in said housing and abutting against but detached from a steering wheel of the vehicle for rendering said signal operative, said means engaging said wheel at points fore and aft of the axle of said wheel.

3. In a direction indicator for vehicles, the combination of the steering wheels of the vehicle, a gong, a clapper yieldingly urged toward the gong, members abutting a structural portion of one of the vehicle steering wheels at points fore and aft of the axle for said wheel, and means operable by said members for moving said clapper away from the gong.

4. In a direction indicator for vehicles, the combination of the steering wheels of the vehicle, a gong, a clapper, a shaft on which said clapper is loosely pivoted, means for yieldingly urging the clapper toward the gong, an arm for moving said clapper away from the gong, and means for actuating said arm comprising members engaging a structural portion of one of the vehicle steering wheels at points fore and aft of the wheel axle.

5. In a direction signal for vehicles, the combination of the steering wheels of the vehicle, a gong, a clapper for said gong, a shaft on which said clapper is loosely mounted, a pivotally mounted arm movable in one direction for moving said clapper away from the gong, and means engaging one of the vehicle steering wheels and operable by change in direction of travel of said wheel for actuating said arm and clapper.

6. In a direction signal for vehicles, the combination of the steering wheels of the vehicle, a gong, a shaft, a clapper for the gong, a trip for moving said clapper away from the gong, actuating means operated by a steering wheel and engageable with said trip for moving said clapper away from the gong, and means for yieldingly forcing said clapper toward the gong upon disengagement of said trip and trip-actuating means.

7. In a direction signal for vehicles, the combination of the steering wheels of the vehicle, a gong, a pivotally mounted clapper, a trip for moving said clapper away from the gong, a slidably mounted rod having a bifurcated end engaging a structural portion of a steering wheel of the vehicle, means on said bar engageable with said trip for actuating the same, and a spring for forcing said clapper toward the gong upon disengagement of said trip and trip-actuating means.

8. In a direction signal for vehicles, the combination of the steering wheels of the vehicle, a gong, a clapper for the gong, a trip member operable for moving the clapper away from the gong, trip-actuating means engaging one of the steering wheels of the vehicle and movable into engagement with said trip upon change in direction of travel of the wheel, and means for yieldingly forcing the clapper against the gong upon disengagement of said trip-actuating means from said trip member.

9. In a direction signal for vehicles, the combination of the steering wheels of the vehicle, a gong, a clapper for the gong, a trip member operable for moving the clapper away from the gong, trip-actuating means engaging one of the steering wheels of the vehicle and movable into engagement with said trip upon change in direction of travel of the wheel, means yieldingly forcing the clapper against the gong upon disengagement of the trip and its actuating means, a cushioning member, and means for interposing said cushioning member between the clapper and gong.

10. In a direction signal for vehicles, the combination of the steering wheels of the vehicle, a slidable bar having a bifurcated end, a support in which said slidable bar is mounted for rericprocatory movement, means for yieldingly urging the bifurcations of the bar against a structural portion of one of the vehicle steering wheels, said bifurcations engaging said wheel at points fore and aft of the center of rotation of the wheel, an audible signal, and means carried by said bar for actuating said signal upon change in direction of travel of said vehicle wheel.

11. In a direction signal for vehicles, the combination of the steering wheels of the vehicle, a slidable rod having a bifurcated end, means for yieldingly urging the bifurcations of said rod against a structural portion of one of the vehicle wheels, said bifurcations engaging said wheels at points fore and aft of the center of rotation of said wheel, an audible signal comprising a gong and a clapper, a pivotally mounted bar on which said clapper is mounted, a trip member for rocking said bar and clapper away from the gong, a trip finger on said rod for moving said trip member in one direction to rock the clapper, said member being free to move in the opposite direction independently of the clapper bar, and means for yieldingly urging the clapper and clapper bar toward the gong.

FRANÇOIS COURTINADE.